(12) United States Patent
Melton

(10) Patent No.: US 7,268,837 B2
(45) Date of Patent: Sep. 11, 2007

(54) METHOD AND SYSTEM FOR AUTOMATED CONVERGENCE AND FOCUS VERIFICATION OF PROJECTED IMAGES

(75) Inventor: Randall Melton, Carrollton, TX (US)

(73) Assignee: Texas Instruments Incorporated, Dallas, TX (US)

(*) Notice: Subject to any disclaimer, the term of this patent is extended or adjusted under 35 U.S.C. 154(b) by 32 days.

(21) Appl. No.: 11/096,480

(22) Filed: Apr. 1, 2005

(65) Prior Publication Data

US 2005/0168659 A1    Aug. 4, 2005

Related U.S. Application Data (62) Division of application No. 10/054,063, filed on Nov. 13, 2001, now Pat. No. 6,995,810.

(60) Provisional application No. 60/250,450, filed on Nov. 30, 2000.

(51) Int. Cl.
*H04N 5/64* (2006.01)
*H04N 5/74* (2006.01)
*H04N 9/31* (2006.01)

(52) U.S. Cl. .................. 348/807; 348/745; 348/177; 348/180; 348/189; 348/750; 348/758; 348/778; 348/806

(58) Field of Classification Search ............. None
See application file for complete search history.

(56) References Cited

U.S. PATENT DOCUMENTS

| | | | |
|---|---|---|---|
| 5,258,830 A | 11/1993 | Schmidt et al. | |
| 5,345,262 A | 9/1994 | Yee et al. | |
| 5,532,765 A | 7/1996 | Inoue et al. | |
| 5,699,440 A | 12/1997 | Carmeli | |
| 5,835,135 A | 11/1998 | Hamaguri et al. | |
| 6,424,412 B1 | 7/2002 | Matthews | |
| 6,456,339 B1 | 9/2002 | Surati et al. | |
| 6,483,555 B1 | 11/2002 | Thielemans et al. | |
| 6,503,195 B1 | 1/2003 | Keller et al. | |
| 6,717,625 B1 | 4/2004 | Thielemans | |
| 2002/0024708 A1* | 2/2002 | Lewis et al. ............... 359/197 |

* cited by examiner

*Primary Examiner*—Brian P. Yenke
(74) *Attorney, Agent, or Firm*—Charles A. Brill; Wade James Brady, III; Frederick J. Telecky, Jr.

(57) ABSTRACT

A method and system that objectively measures the convergence and focus of a 2 or 3 spatial light modulator (SLM) projection display. The system uses five (5) CCD cameras and a frame grabber to store red, green, and blue (R-G-B) data from selected pixels located in the corners and center of the projector's field-of-view. The horizontal and vertical locations for the R-G-B pixels at each of the five locations is determined and the delta (Δ) displacement of the green and blue pixels, relative to the reference red pixel, is calculated and used to converge the image. The optical focus of the system is also determined using a Fast Fourier Transform (FFT). The FFT is performed on this same data and a power spectrum summation beyond the first mimima is determined. The focus is then adjusted to maximize this value.

10 Claims, 11 Drawing Sheets

METHOD AND SYSTEM FOR AUTOMATED CONVERGENCE AND FOCUS VERIFICATION OF PROJECTED IMAGES

This application is a Divisional of application Ser. No. 10/054,063, filed Nov. 13, 2001 now U.S. Pat. No. 6,995,810 and Provisional Application No. 60/250,450, filed Nov. 30, 2000.

BACKGROUND OF THE INVENTION

1. Field of the Invention

The present invention relates to the field of projection displays and more specifically to the automated measurement of such displays.

2. Description of the Related Art

The convergence and focus of projection displays having more than one spatial light modulator (SLM) are typically determined subjectively by an operator. As a result, repeatability and tight tolerances in converging and focusing many projectors are difficult to accomplish. The results often depend on the skill and motivation of the person making the adjustments.

Figure 1A:
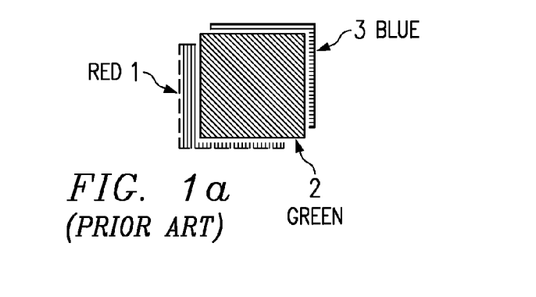
FIG. 1a illustrates the three planes (red, green, and blue) for an out-of-convergence image. (prior art)
Figure 1B:
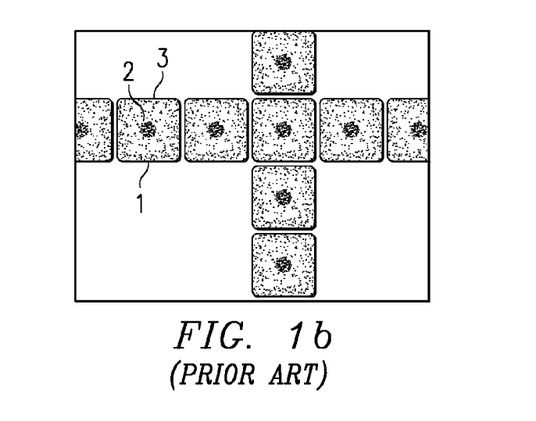
FIG. 1b shows a row and column of non-converged pixels. (prior art)

FIG. 1 illustrates the convergence issue in a three-micromirror projection display (used for example only). The three micromirrors, each dedicated to one of the three primary colors of light (red, green, and blue), respectively are embedded within the optical system of the projector. The images from these three micromirrors are combined by means of combining prisms and as a result, require mechanical alignment so that corresponding pixels from each array lay exactly on top of each other. FIG. 1a shows the same pixel from each of the red 1, green 2, and blue 3 micromirrors. In this out-of-convergence example, where the green 2 pixel is the reference, the red 1 and blue 3 pixels are shifted relative to the reference green 2 pixel as shown in Table 1 below.

TABLE 1

|   | X    | y    |
|---|------|------|
| R | −0.4 | −0.2 |
| G | 0    | 0    |
| B | +0.2 | +0.2 |

It is clear from the figure that this system needs to be converged, at least in the area of the observed pixel. This is best illustrated by the picture of FIG. 1b, which shows the unaligned red 1 and blue 3 pixels relative to the reference green 2 pixel. (Note: these show up as fuzzy edges in this B/W illustration, but as mis-aligned color pixels in a color photo). In the actual color picture, the non-convergence is best observed along the edges of the pixel where a blue leading edge is seen-at the top and right edge of the pixel and a red trailing edge is seen at the bottom and left edge of the pixel. Typically, an operator would adjust the x and y locations of the red 1 and blue 3 micromirrors until the three images align with on another and the system is converged, resulting in a white image.

Figure 2:
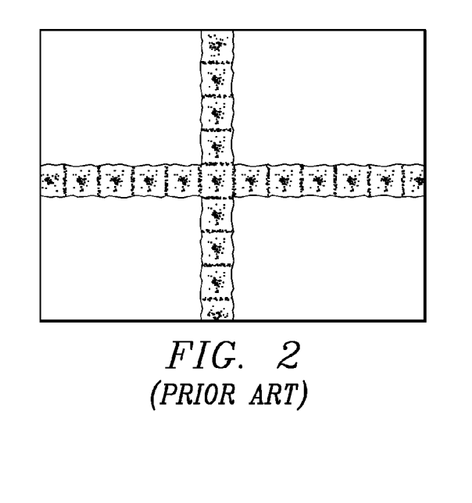
FIG. 2 shows a row and column of an out-of-focus image. (prior art)

Focus is another parameter where the adjustment by an operator is often made subjectively. This parameter is more complicated to properly adjust, with many variables involved. For example, brightness can affect the focus significantly. In a projection system, focus is usually accomplished by means of the projection lens, which can be either a zoom or fixed focal length lens. FIG. 2 illustrates a row and column of pixels from a three-micromirror projection system, which is clearly out-of-focus. Typically, the projector's operator will adjust the projection lens to provide the best focus, according to his desires.

Figure 3:
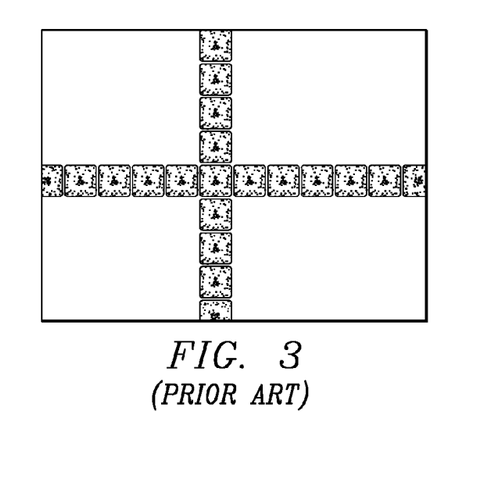
FIG. 3 shows a row and column of a subjectively focused and converged image, based on operator's discretion. (prior art)

FIG. 3 shows a row and column of pixels that have been both converged and focused manually by an operator. This shows the image properly converged, with the red, green, and blue pixels being properly aligned so as to appear as one pixel, white in color, and with sharp edges around both the pixel and around the hole in the center of the pixel. This hole in the center of the pixel is where the support post for the micromirror attaches to the mirror.

What is needed is an objective method for convergence and focus criteria along with a measuring tool for implementing the method. This method needs to reflect the human element since the human eye is the final arbitrator in a display application. The invention disclosed herein addresses this need by means of both a method and a tool.

SUMMARY OF THE INVENTION

The method and system disclosed in this invention provide an objective tool for measuring the convergence and focus criteria of a projected image. In addition, lens aberrations caused by lateral color shift are programmatically corrected.

To converge the red, green, and blue images from a projector, snapshots are taken at several locations across the field-of-view. Data from each of these snapshots is separated into primary color images (typically red, green, and blue). The centroid of an identical row and column in each of the three (red, green, and blue) images is measured and the differences in the x and y position between the red (reference) centroid data and the green and blue data indicates the amount of adjustment of the green and blue images that is required to converge the image.

Focus for each Primary color is accomplished by processing the three horizontal data arrays previously chosen by the user. After normalizing the data, a single-sided, scaled power spectrum of the array data is derived. Focus criteria are determined by summing the elements of the power spectrum array to the right of the first relative minima in the spectrum. This power spectrum sum is then maximized for optimal focus.

DETAILED DESCRIPTION

The method and system of this invention provide an objective tool for measuring the convergence and focus criteria of a projected image. In addition, lens aberrations caused by lateral color shift are programmatically corrected.

The method for objectively converging the primary color images, typically red, green, and blue, involves capturing a magnified snapshot from several locations across the field-of-view of the picture and separating this data into a separate image for each of the modulators.

While two or three captured images are enough to perform the convergence and focus operations, additional images improve the process and provide better results. Typically five captured images are used. Each captured image typically is 640×480 pixel, 24-bit color image. The captured images are separated into three 8-bit images, one for each modulator and typically are stored in DIB format.

The modulators typically each provide a primary color image, such as red, green, and blue images, simplifying the separation process. Although this disclosure is in terms of the use of five 640×480 24-bit images, each dissolved into three 8-bit images, it should be understood this is for purposes of illustration and not for purposes of limitation. Other image resolutions, bit-depths, and numbers of images and modulators are also applicable to the processes taught herein.

After capturing the images, a line and column of interest are chosen from the file and the resulting three horizontal (line) data arrays (Red, Green, and Blue) and three vertical (column) data arrays are used to determine the horizontal and vertical center-points of the three (Red, Green, and Blue) pixels. Using the Red pixel (optional selection) as a reference, the convergence adjustment is calculated by measuring the differences in the x and y dimensions between the Green and Blue pixel's center-points and the Red reference pixel's center-point. The green and blue center-points can then be moved to overlay the red center-point, thereby converge the image.

Figure 4A:
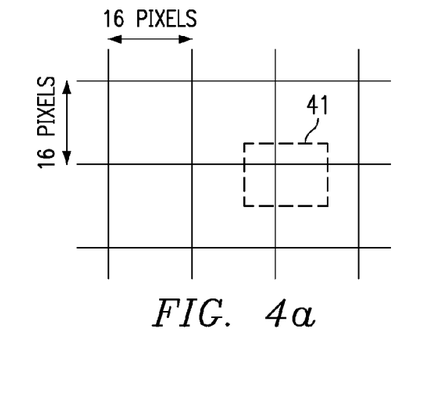
FIGS. 4a and 4b are diagrams indicating where test images are taken in the image's field-of-view.
Figure 4B:
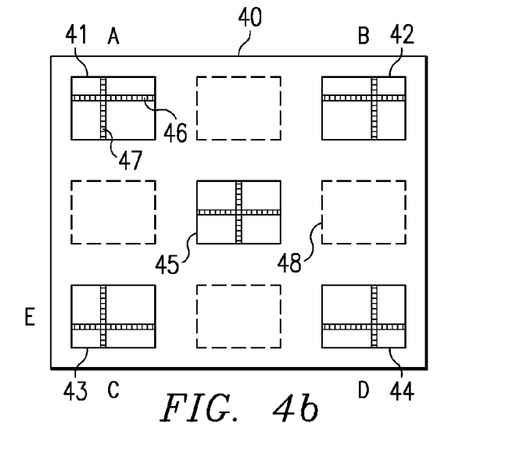

In the method, a row and column grid pattern is turned ON in the projected image, as shown in FIG. 4a. For example, every 16$^{th}$ row and column of pixels might be turned ON. A magnified 640×480 size image is then captured around one of the grid pattern intersections. FIG. 4b is a diagram showing the locations 41-45 where the five magnified 24-bit snapshots (A-E) are taken across the field-of-view 40 of the picture. These locations can vary, for example as shown by the dotted line squares 48. A line 46 and column 47 of data is chosen for each of the five snapshots for use in converging the picture. The conditions are established by turning ON only the pixels in the chosen row and column over the area of the snapshot.

Figure 4C:
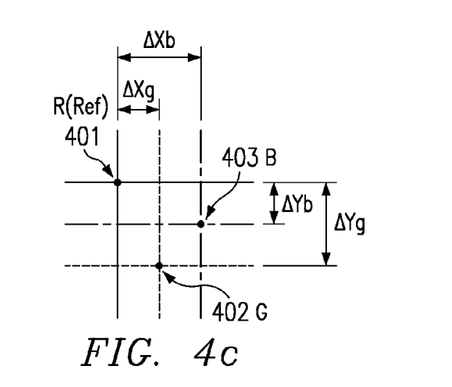
FIG. 4c is a diagram of an un-converged image showing the x and y deltas (Δ).
Figure 4D:
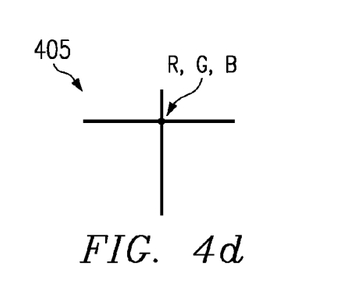
FIG. 4d is a diagram of a converged image.

For each of the five snapshots, a 24-bit DIB data file is separated into three 8-bit 640×480 data arrays, one representing each of the three primary colors, red, green, and blue. FIG. 4c is a diagram of an overlay of three un-converged red-green-blue images taken from the same row and column in the snapshot. Any of the three images could be used as a reference image, for example red in the diagram. The x and y distances (ΔXg and ΔYg) are then measured between the green row and column intersection 402 and the red (ref) intersection 401 as indicated and likewise the x and y distances (ΔXb and ΔYb) are then measured between the blue row and column intersection 403 and the red (ref) intersection 401. The images from the green 402 and blue 403 SLM's can then be adjusted to overlay the image from the red 401 SLM as indicated in FIG. 4d, where the red, green, and blue images are converged 405.

Figure 5:
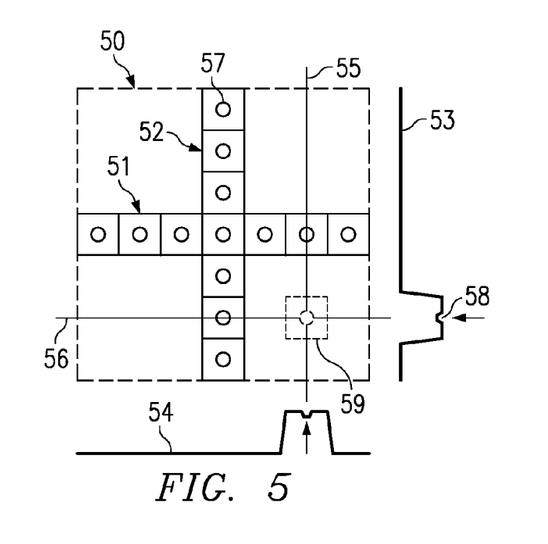
FIG. 5 is a drawing showing how the horizontal and vertical waveforms for the selected row and column are generated.

FIG. 5 shows the details of the method used in converging the red, green, and blue images. Given one of the snapshots 50, consisting of a magnified row 51 and column 52 of ON pixels, the pixel 59 of interest is chosen by the placement of the horizontal and vertical cursors (lines) 55 and 56, respectively. The data is then sampled to provide the horizontal row and vertical column waveforms 53 and 54, respectively, for the selected pixel. The 24-bit image is separated into three 8-bit images (red, green, and blue) that are processed individually. When the snapshot area is scanned for each of the three 8-bit images at the selected pixel location, the amplitude of the horizontal and vertical output signals 53-54 will go from 0 volts to a positive value (example: 0 to 5 volts) in the area of the selected pixel, as shown. The method involves measuring the width of these two pulses (horizontal 53 and vertical 54) and then determining the center of each pulse. The point where these two lines 55-56 intersect corresponds to the centroid of the pixel for a given color (red, green, or blue). In the case of a typical micromirror, there is a hole 57 located at the center of each pixel, where the mirror connects to its support post, which causes a dip 58 in the waveform. This dip 58 can complicate the process of locating the center of the waveform.

Figure 6:
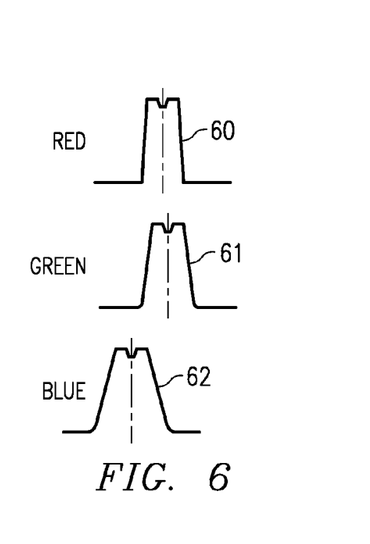
FIG. 6 is a sketch of the differing red, green, and blue waveforms.

In locating the center of a row or column of pixels, there can be several complications involved. First, there is the dip at the center top of the waveform discussed above. Then there is the fact that waveforms representing the three colors each may have a somewhat different shape, as illustrated in FIG. 6. The red waveform 60 is the closest to being ideal and is therefore preferred as the reference to which the green and blue images are adjusted. The green pulse 61 is slightly wider than the red pulse 60. The blue pulse 62 is also wider and tends to flare out even more at the lower levels. All these areas of complication have to be contended with in the process of converging the image.

Figure 7:
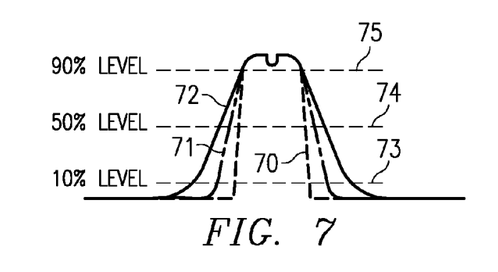
FIG. 7 describes the waveform's 90% amplitude level where the pulse width is measured.

FIG. 7 illustrates the method for overcoming the problems created by the amount of flaring of the three pulses at the lower levels. The red 70, green 71, and blue 72 pulses are shown along with three lines 73-75 which represent the 10%, 50%, and 90% amplitude levels, respectively. The method is to first normalize the three pulse heights so as to have the same amplitude (255 quantization level) and then to measure the pulse widths at the 90% amplitude level 75. This places the point of measurement above most of the flaring and as a result provides accurate pulse widths. From these pulse widths the center of the three primary color pixels (red, green, and blue) is determined.

Figure 8A:
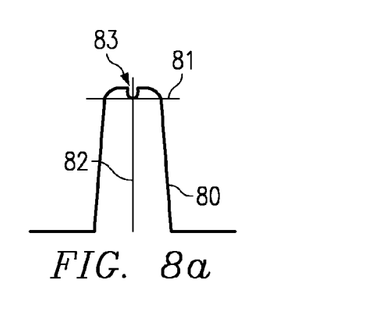
FIG. 8a indicates the desired waveform's centroid.
Figure 8B:
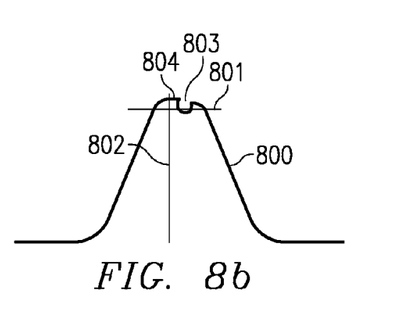
FIG. 8b indicates a false waveform centroid.
Figure 8C:
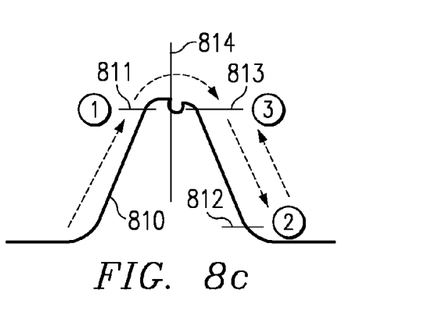
FIG. 8c illustrates the method for avoiding false waveform centroid measurements.

FIG. 8*a* is a sketch of an ideal pulse 80, which represents the pixel width, with the pulse width being measured at the 90% level 81 and the center of the pixel, indicated by line 82, falling directly through the dip in the waveform. However, as shown in FIG. 8*b* it is possible for the dip 803 at the top of the pulse 800 to fall to or below the 90% level 801 and as a result for the centerline 802 to be established in the center of one of the side lobes 804 instead of at the actual center of the pulse. The method used to overcome this potential problem is described in FIG. 8*c*. Here three levels are determined for the pulse 810; i.e., (i) at the 90% level 811 on the leading edge, (ii) at the 10% level 812 on the trailing edge, and (iii) at the 90% level 813 on the trailing edge. The method for finding the center of the pulse is to first find the 90% level 811 on the leading edge, to go over the top of the pulse and down the trailing edge to the 10% level 812, and then back up the trailing edge to the 90% level 813. The width of the pulse is then measured as the difference between the leading edge 90% level 811 and the trailing edge 90% level 813. The center of the pixel is shown by the line 814 at the mid-point of this difference. This approach avoids the possibility of making the measurements on one of the side lobes.

Figure 9A:
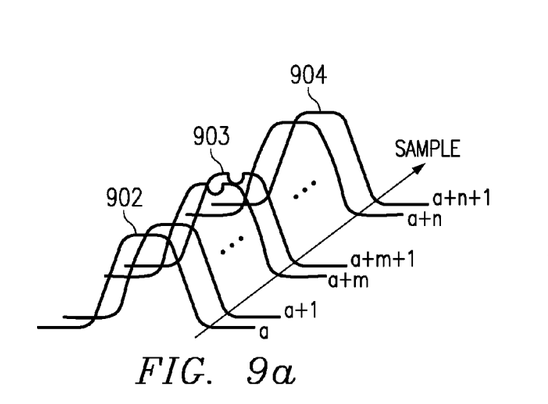
FIGS. 9a, 9b and 9c illustrate the method of averaging the waveforms for multiple cuts across a pixel.
Figure 9B:
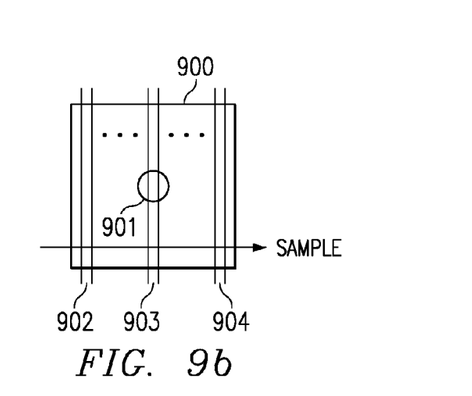

To this point the discussion has centered around a single scan taken through the center of a pixel. In order to improve the accuracy, multiple sweeps (up to 20 passes) are taken across the pixel in both the horizontal and vertical direction and an average of these pulses is used to make the calculations, as described in FIG. 9. FIGS. 9*a* & 9*b* indicate how multiple scans are made across a pixel 900 with scans 902 being on one side of the pixel center hole 901, other scans 903 through the area of the center hole 901, and additional scans 904 on the other side of the pixel center hole 901. These scans, shown for a row of pixels, apply equally to scans made across a column of pixels. For example, in the case where 20 scans are made per pixel, assume that $a=1$, $a+m=10$, and $a+n+1=20$.

Figure 9C:
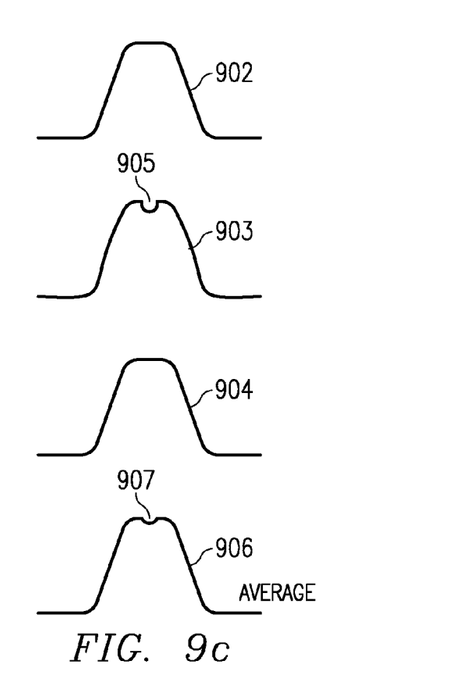

FIG. 9*c* shows the results of averaging the scans. Here, waveforms 902 & 904, on either side of the pixel, do not exhibit a dip 905 at the peak amplitude while scans 903 through the center of the pixels do have the dip 905 at peak amplitude. The average pulse 906 tends to reduce the effects of any flaring on the edges of the pulse across the pixel and reduces the size of the dip 907 at the top of the pulse 906. The convergence accuracy is improved by using this averaging approach.

Table 1 is an overview of the algorithm of this invention, used in converging the three SLM (red, green, and blue).

TABLE 1

| CONVERGENCE ALGORITHM |
| --- |
| DETERMINE PIXEL WIDTH |
| DETERMINE PIXEL HEIGHT |
| DETERMINE PIXEL CENTER-X |
| DETERMINE PIXEL CENTER-Y |
| FIND HORIZONTAL LINE |
| FIND VERTICAL COLUMN |
| SET (ALIGN) LINE AND COLUMN |

The method used for the automated focusing of a projected image, under varying illumination conditions, is very difficult. However, it is possible to adjust the focus of the optics to an optimal number during the assembly phase of a projector. The method disclosed in this invention does this and can be used to assure that the focus parameter for shipped projector products are optimally focused and meet specification. The user of the projector can then manually focus the projector to match the brightness and other environmental conditions for a particular application.

In the automated focus method disclosed herein, focus for each color (red, green, and blue) is accomplished by processing the three horizontal data arrays previously used in converging the pixels. After the data is normalized, a single-sided, scaled power spectrum of the data array is derived. Focus criteria are then determined by summing the elements of the power spectrum array to the right of the first relative minima in the spectrum. As the optics are adjusted, the value of the summed power spectrum is observed until a power sum maximum value is found.

Figure 10A:
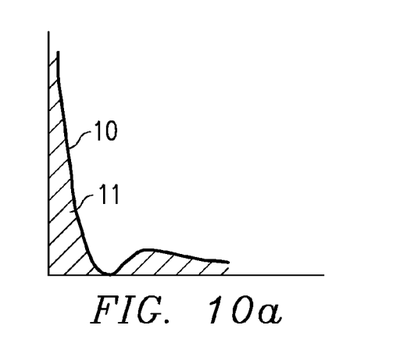
FIG. 10a is the Fast Fourier Transform (FFT) for a horizontal pulse with sharp edges.
Figure 10B:
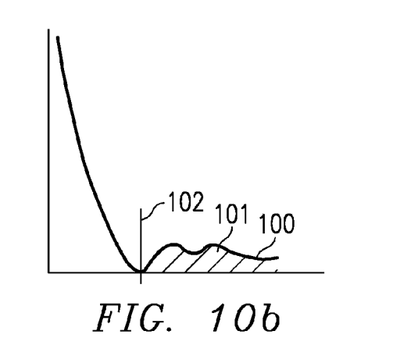
FIG. 10b illustrates the power sum determined in the tail of the FFT.
Figure 11A:
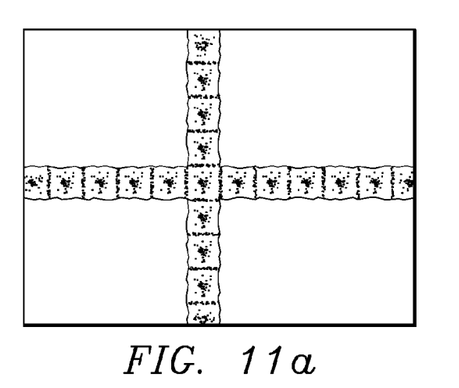
FIG. 11a shows an out-of-focus image.
Figure 11B:
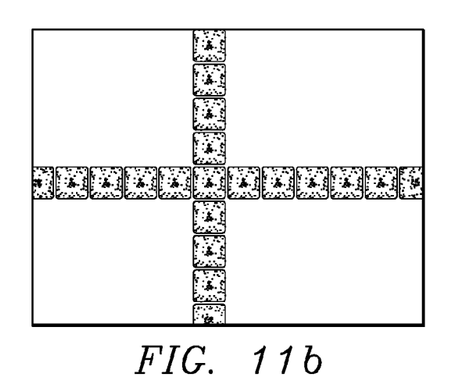
FIG. 11b shows an image focused using the method of this invention.
Figure 12A:
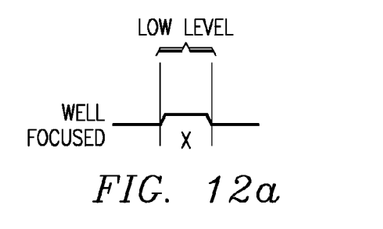
FIGS. 12a and 12b illustrate well-focused and poorly-focused waveforms, respectively.
Figure 12B:
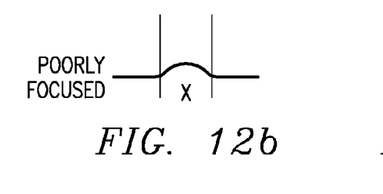
Figure 12C:
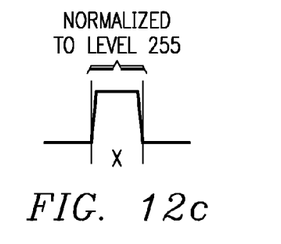
FIGS. 12c and 12d show the waveforms of FIGS. 12a and 12b normalized to level 255.
Figure 12D:
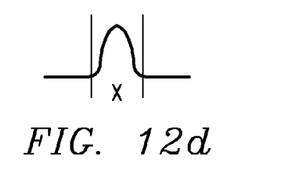

FIG. 10*a* illustrates a typical Fast Fourier Transform (FFT) 10 taken for the horizontal pulses with relative sharp edges, as shown earlier in FIG. 6. The power spectrum is the area 11 under the curve and is determined by adding the discrete values under the curve. By maximizing this sum the focus can be controlled. In practice, it was found that the sensitivity of the focus adjustment could be improved by maximizing the area 101 in the tail of the FFT curve 100 to the right of the first minima 102, as shown in FIG. 10*b*. FIG. 11*a* shows an out-of-focus image and FIG. 11b shows the same image focused using the method of this invention.

As illustrated by FIG. 12, focus is dependent on the light levels. FIGS. 12a and 12b show well focused and poorly focused, low light level pulses, respectively. Due to the sharp rise and fall times of the well focused pulse of FIG. 12a, there is more area 101 in the tail 100 of the power spectrum (FIG. 10b) curve then there is for the more rounded edges of the poorly pulses of FIG. 12b. To reduce the effects of this problem, the pulses are first normalized to level 255 (maximum 8-bit level) before processing the data array, as shown in FIGS. 12c and 12d, respectively.

Table 2 is an overview of the algorithm of this invention, used in focusing the image.

TABLE 2

FOCUS ALGORITHM

USING CAPTURED DATA
PERFORM SINGLE-SIDED FFT
DETERMINE MAX-MIN
FIND FIRST MINIMA OF ARRAY
SUM ARRAY ELEMENTS TO RIGHT OF MINIMA

Figure 13A:
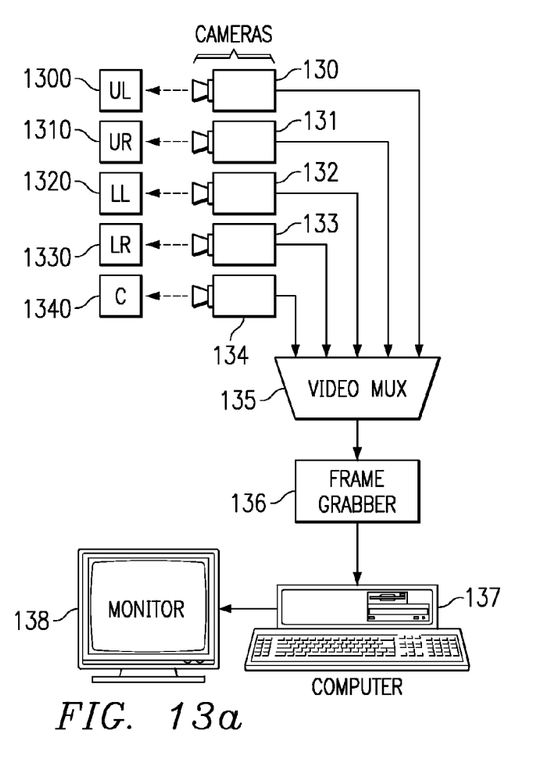
FIG. 13a is a block diagram of the automated convergence and focus system of this invention.
Figure 13B:
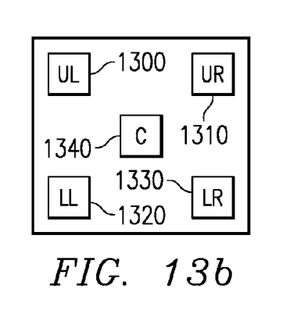
FIG. 13b shows typical viewing window locations for the automated convergence and focus system of this invention.

FIG. 13a is a system block diagram for carrying out the convergence and focus methods of this invention. Five Cameras 130-134 are used to store data from magnified views at the selected locations across the field-of-view; for example, locations at the upper left (UL) 1300, upper right (UR) 1310, lower left (LL) 1320, lower right (LR) 1330, and center (C) 1340 of the field, as indicated in FIG. 13b. The system is comprised of the cameras 130-134, a video multiplexer (MUX) 135, a frame grabber 136, a computer 137, and a viewing monitor 138.

Figure 14:
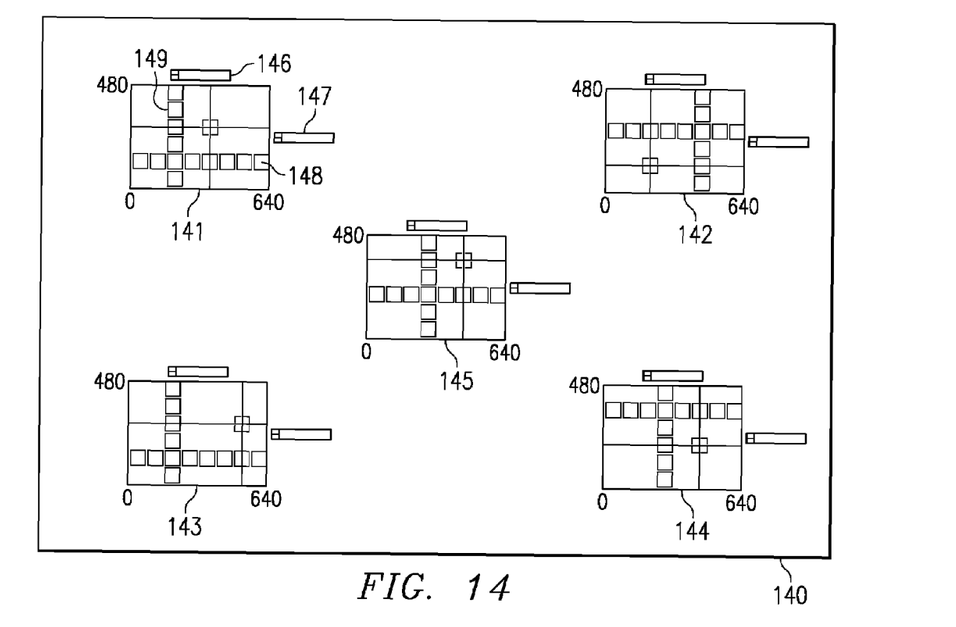
FIG. 14 is a sketch of a typical monitor screen showing the automated convergence data of this invention.

FIG. 14 illustrates a typical convergence screen 140 as seen by the operator on the monitor 138. This screen example shows the five sampling windows 141-145. In each window, the center of the pixel height and width is displayed in windows 146 and 147, respectively.

Figure 15:
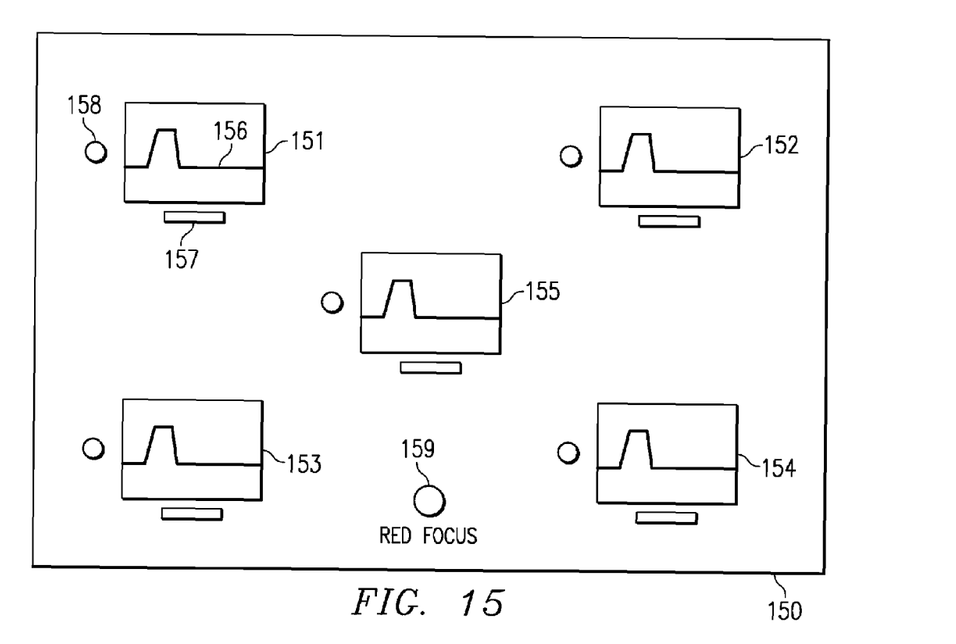
FIG. 15 is a sketch of a typical monitor screen showing the automated focus data of this invention.

FIG. 15 illustrates a typical focus screen 150 as seen by the operator on the monitor 138. This screen example shows the pixel waveforms 151-155 for each pixel. The power spectrum value is displayed for each pulse in a window (example, window 157). Lights indicating the best focus 158 and Red (reference) focus 159 are also included.

Figure 16A:
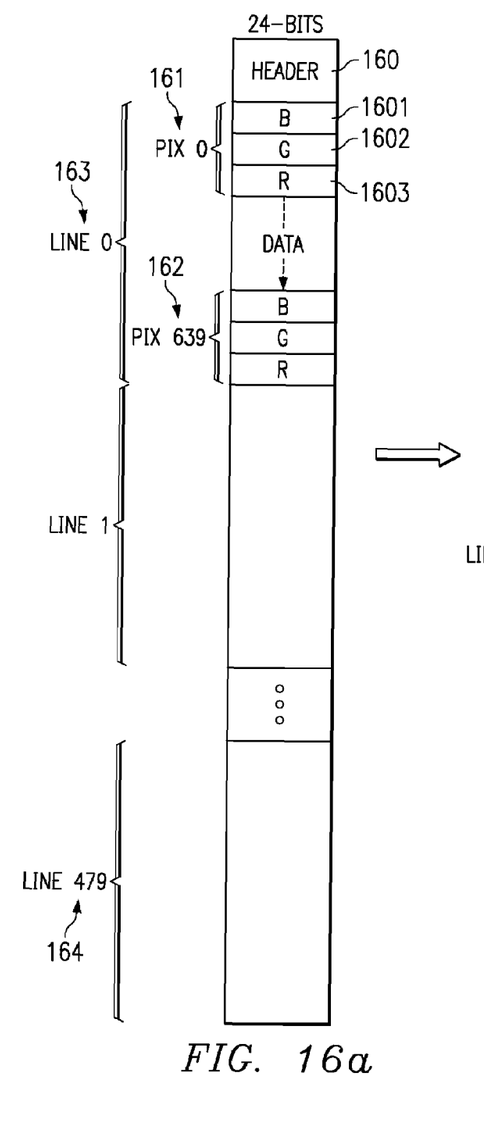
FIG. 16 is a diagram of the data format used in the automated convergence and focus system of this invention.
Figure 16B:
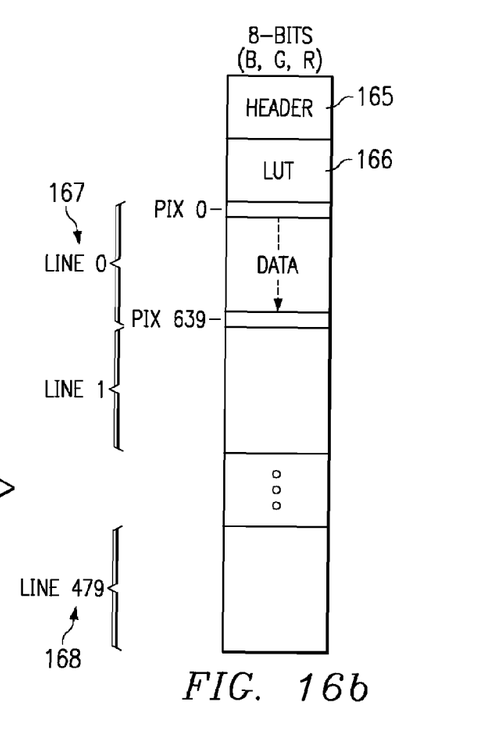
Figure 17A:
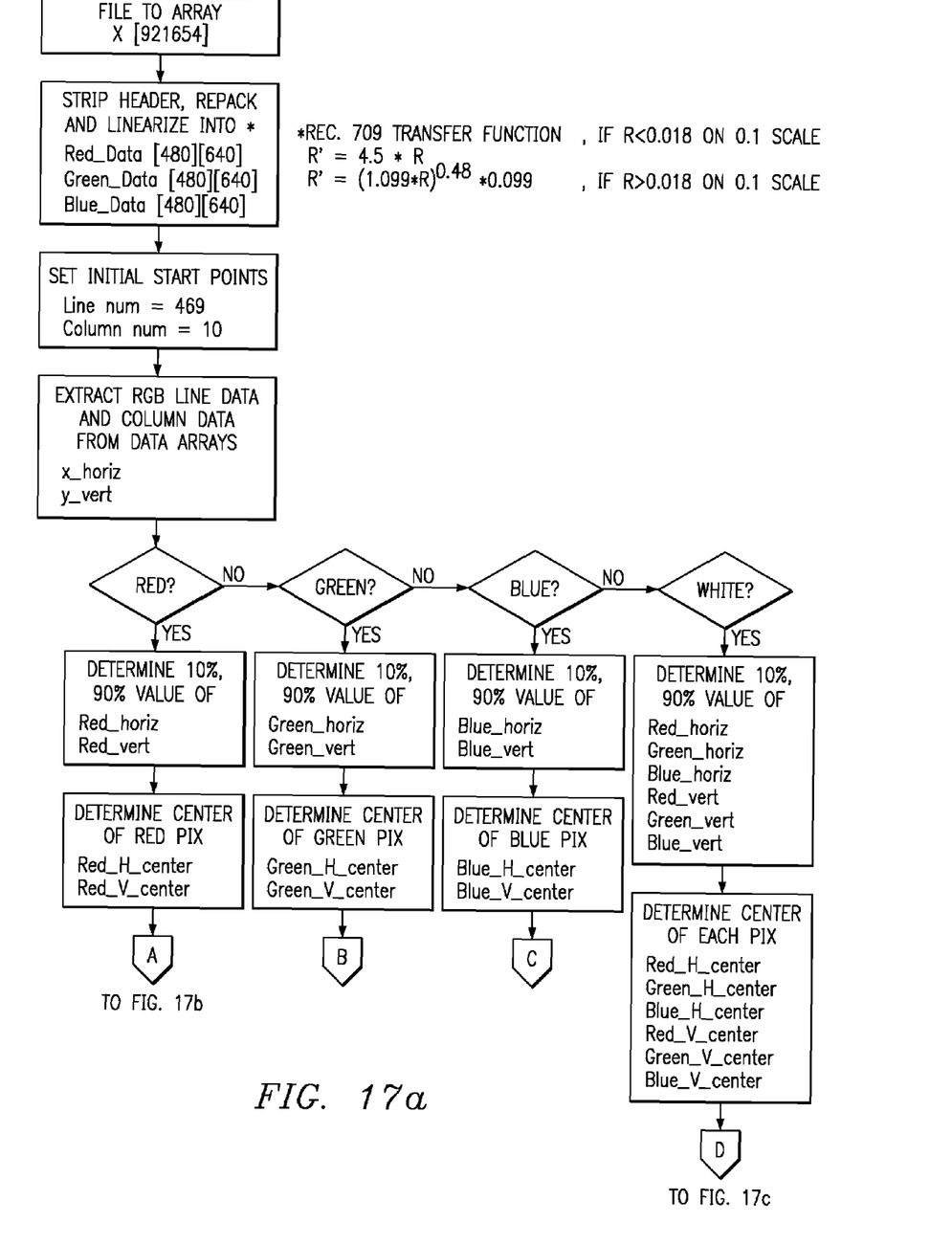
FIG. 17a is a portion of a flow chart showing the algorithm used for the automated focus and convergence operation.
Figure 17B:
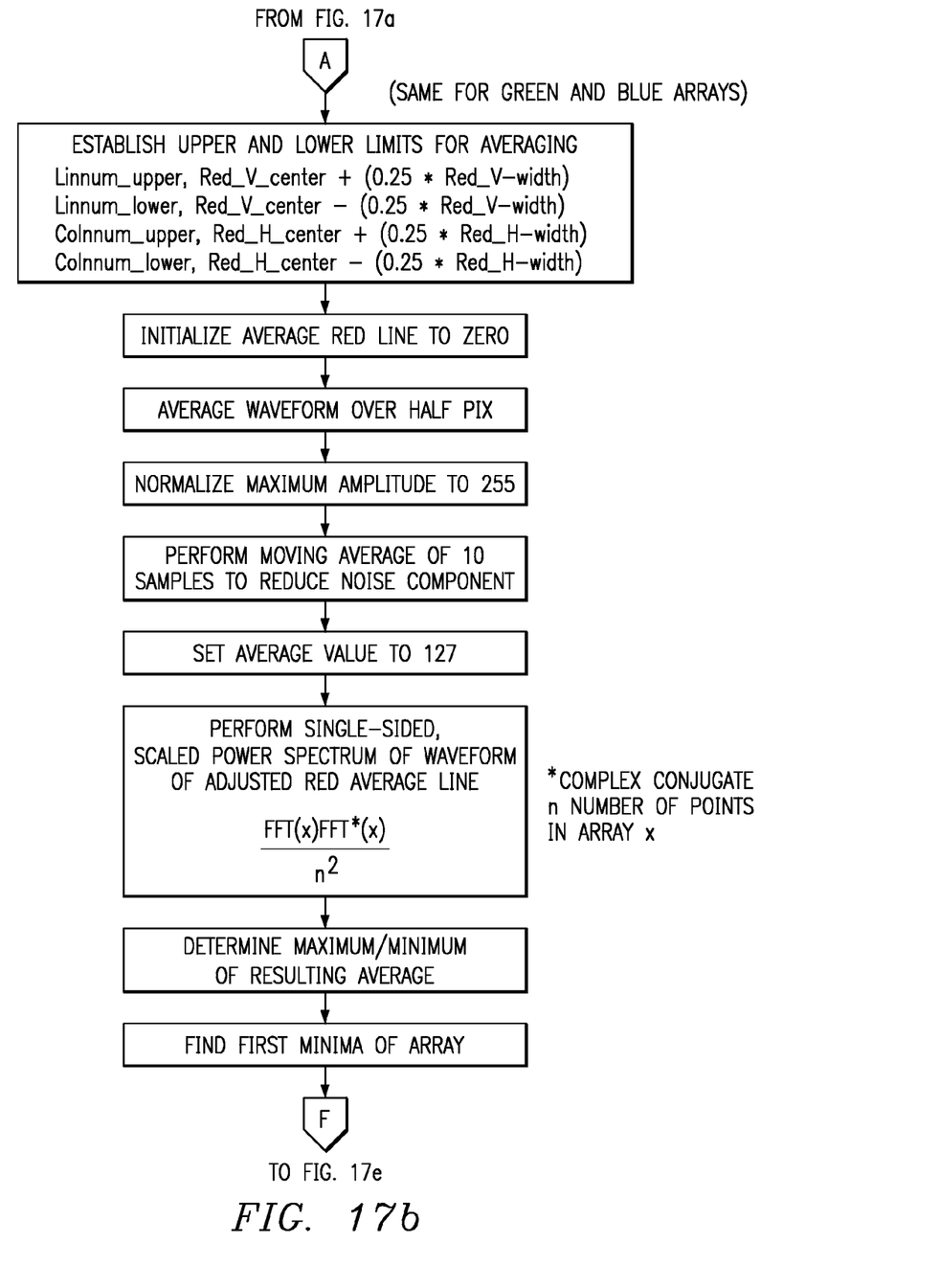
FIG. 17b is a portion of a flow chart showing the algorithm used for the automated focus and convergence operation.
Figure 17C:
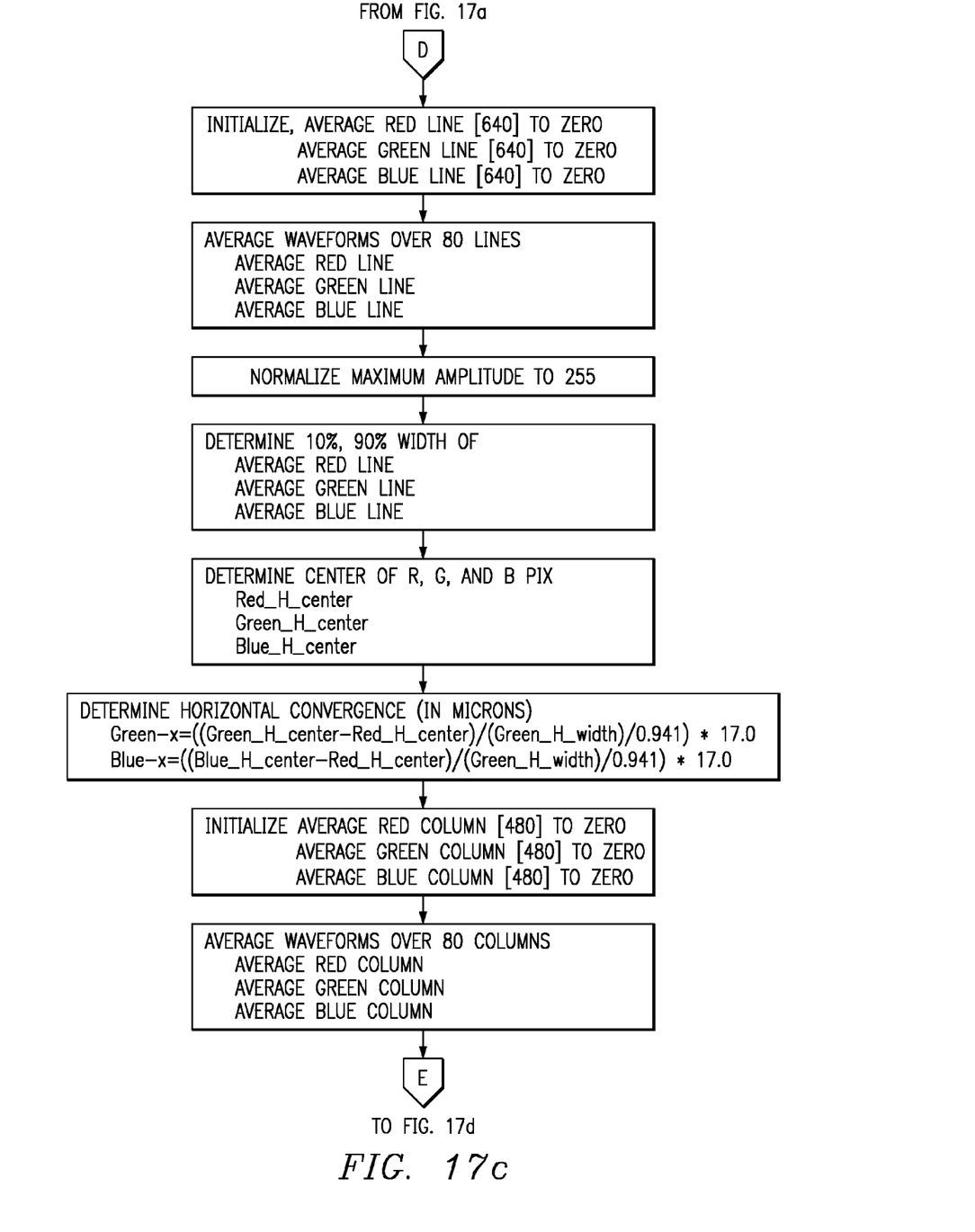
FIG. 17c is a portion of a flow chart showing the algorithm used for the automated focus and convergence operation.
Figure 17D:
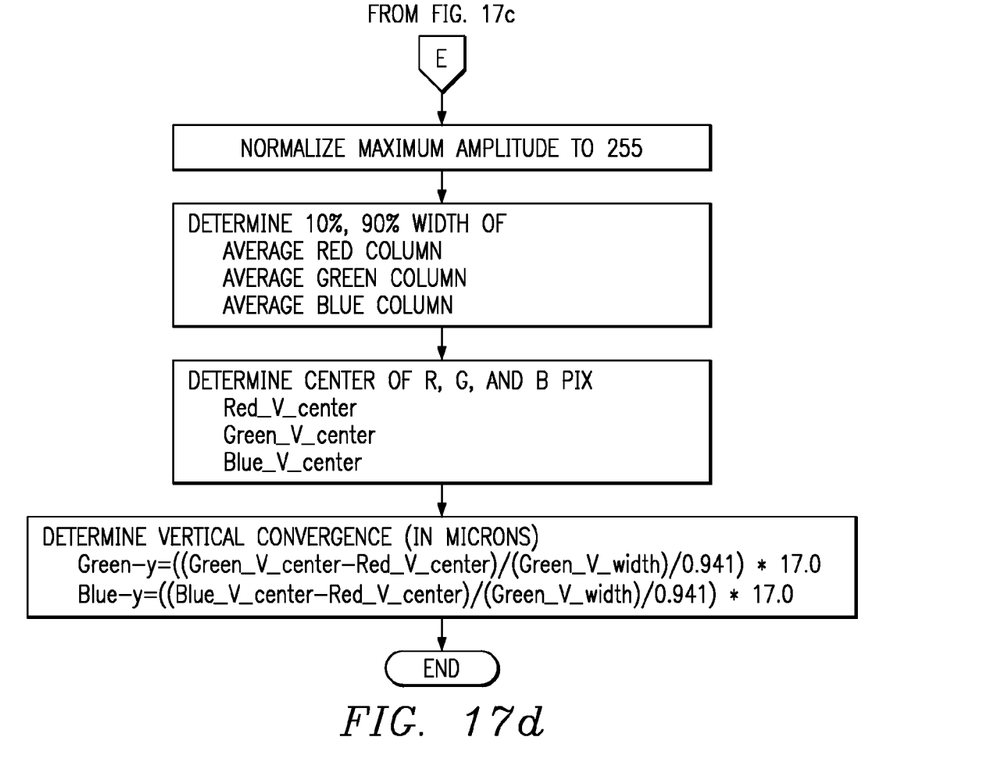
FIG. 17d is a portion of a flow chart showing the algorithm used for the automated focus and convergence operation.
Figure 17E:
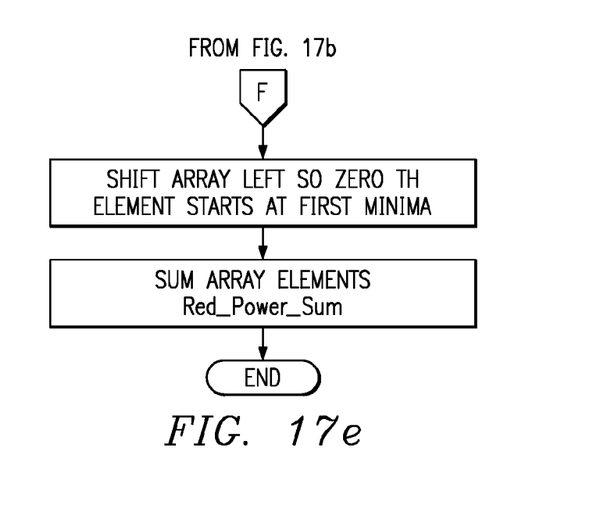
FIG. 17e is a portion of a flow chart showing the algorithm used for the automated focus and convergence operation.

FIG. 16a shows the format for storing the data for each selected pixel in the computer's 137 memory. First, the 24-bit (B, G, R) image is stored as a BMP file. This file consists of a header 160 followed by the blue 1601, green 1602, and red 1603 data for horizontal pixel 0 through 639 (161, 162) of line 0 (163). This process is repeated over and over for lines 1 through 479 (164). The 24-bit data is then separated into the three R, G, B 8-bit data files, as shown in FIG. 16b. The file format of the data for each of the primary colors starts with a header 165 and a look-up-table (LUT) 166. The data then follows for pixel 0 through 639 for line 0 (167) through 479 (168).

In operation, the data from this system is used to converge and focus the red, green blue images. Aligning the three SLM's to provide proper convergence could be done using fly-in-place robots, or other automated techniques, or even by manual adjustment. The optical focus is adjusted to provide a maximum power spectrum summation value.

FIGS. 17a through 17e provide a more detailed listing of the pseudo-code for the convergence and focus algorithm of this invention.

The same techniques described herein for a 3-SLM application apply as well to a 2-SLM system.

While this invention has been described in the context of preferred embodiments, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

I claim:

1. A method for convergence of an image projected by at least two modulators, the method comprising:
   turning on a test pixel in said projected image;
   capturing an image of said pixel;
   separating said captured image into a separate image for each modulator;
   determining the x and y location of said test pixel, wherein average x and y pulses representing said test pixel's width and height are generated by taking at least 20 scans in both horizontal and vertical direction across said test pixel;
   calculating the convergence misalignment of the separated images; and
   aligning said modulators based on the calculated convergence misalignment.

2. The method of claim 1 wherein said projected image is generated by means of at least three spatial light modulators.

3. The method of claim 1 wherein said capturing an image step comprises:
   capturing an image near the center of said projected image; and
   capturing at least four additional images near the perimeter of said projected image.

4. The method of claim 1 wherein the pulse-height of said horizontal and vertical pulses is normalized to a maximum level.

5. The method of claim 4 wherein said test pixel width and height is determined by measuring the width of said normalized pulses at the 90% amplitude level.

6. The method of claim 5, said measuring and determining steps comprising:
   locating the 90% amplitude level of said pulse's leading edge;
   locating the 90% amplitude level of said pulse's trailing edge; and
   setting the center point as the mid-point between said 90% level of leading edge and 90% level of trailing edge.

7. A method for convergence of an image projected by at least two modulators, the method comprising:
   turning on a test pixel in said projected image;
   capturing an image of said test pixel;
   separating said captured image into a separate image for each modulator;
   determining the x and y location of said test pixel by normalizing said captured image and, in both the x and y directions,
      locating a first location on a leading edge of said normalized captured image that exceeds a first threshold, locating a second location on a trailing edge of said normalized captured image that fails to exceed a second threshold, locating a third location on said trailing edge of said normalized captured image that exceeds a third threshold, and averaging said first and third locations; and calculating the convergence misalignment of the separated images.

8. The method of claim 7, said locating a first location comprising:

locating a first location on said leading edge of said normalized captured image that exceeds a 90% of a peak value for said normalized captured image.

9. The method of claim 7, said locating a second location comprising:

locating a second location on said trailing edge of said normalized captured image that fails to exceed 10% of a peak value for said normalized captured image.

10. The method of claim 7, said locating a third location comprising:

locating a third location on said trailing edge of said normalized captured image that exceeds a 90% of a peak value for said normalized captured image.

* * * * *